United States Patent
Lu

(10) Patent No.: US 9,430,091 B2
(45) Date of Patent: Aug. 30, 2016

(54) COORDINATE POSITIONING MODULE, OPTICAL TOUCH SYSTEM, METHOD OF DETECTING POWER OF AN ACTIVE TOUCH MEDIUM, AND METHOD OF SWITCHING MODES OF THE ACTIVE TOUCH MEDIUM

(71) Applicant: PixArt Imaging Inc., Hsin-Chu (TW)

(72) Inventor: Chun-Yi Lu, Hsin-Chu (TW)

(73) Assignee: PixArt Imaging Inc., Hsin-Chu (TW)

(*) Notice: Subject to any disclaimer, the term of this patent is extended or adjusted under 35 U.S.C. 154(b) by 455 days.

(21) Appl. No.: 13/792,209

(22) Filed: Mar. 11, 2013

(65) Prior Publication Data

US 2014/0104238 A1   Apr. 17, 2014

(30) Foreign Application Priority Data

Oct. 17, 2012   (TW) .............................. 101138212 A

(51) Int. Cl.
*G06F 3/042* (2006.01)
*G06F 3/0354* (2013.01)
*G06F 3/033* (2013.01)
*G06F 3/038* (2013.01)

(52) U.S. Cl.
CPC ........... *G06F 3/042* (2013.01); *G06F 3/03542* (2013.01); *G06F 3/0425* (2013.01); *G06F 3/033* (2013.01); *G06F 3/0386* (2013.01); *G06F 3/03545* (2013.01)

(58) Field of Classification Search
None
See application file for complete search history.

(56) References Cited

U.S. PATENT DOCUMENTS

| | | |
|---|---|---|
| 2005/0068300 A1 | 3/2005 | Wang |
| 2009/0070606 A1 | 3/2009 | Chen |
| 2009/0262078 A1 | 10/2009 | Pizzi |
| 2012/0044213 A1 | 2/2012 | Lu |
| 2012/0098797 A1* | 4/2012 | Oh et al. ........................ 345/175 |
| 2013/0002629 A1* | 1/2013 | Cong ............................ 345/211 |

FOREIGN PATENT DOCUMENTS

| | | |
|---|---|---|
| CN | 101887327 A | 11/2010 |
| CN | 102314260 A | 1/2012 |
| CN | 102707817 A | 10/2012 |
| TW | 200512655 | 4/2005 |
| TW | 200912883 | 3/2009 |
| TW | 200940954 | 10/2009 |
| TW | 201020887 A1 | 6/2010 |

\* cited by examiner

*Primary Examiner* — Seokyun Moon
(74) *Attorney, Agent, or Firm* — Winston Hsu; Scott Margo

(57) ABSTRACT

A method of detecting power of an active touch medium is disclosed in the present invention. The method includes capturing an image with an optical signal generated from the active touch medium, reading a first threshold value, comparing an intensity of the optical signal and the first threshold value, and executing a low power mode when the intensity of the optical signal is smaller than the first threshold value.

19 Claims, 5 Drawing Sheets

COORDINATE POSITIONING MODULE, OPTICAL TOUCH SYSTEM, METHOD OF DETECTING POWER OF AN ACTIVE TOUCH MEDIUM, AND METHOD OF SWITCHING MODES OF THE ACTIVE TOUCH MEDIUM

BACKGROUND OF THE INVENTION

1. Field of the Invention

The present invention relates to a coordinate positioning module and a related optical touch system, and more particularly, to a coordinate positioning module having power detecting function and a related optical touch system, a method of detecting power of an active touch medium and a method of switching modes of the active touch medium.

2. Description of the Prior Art

A conventional optical touch apparatus includes two types of design. One type of the conventional optical touch apparatus utilizes the reflection bar or the light guide bar to detect a moving track of the inactive touch object, such as fingers, the stylus unable to emitting light, or any other touch medium, so as to calculate coordinates of the inactive touch object. The other type of the conventional optical touch apparatus utilizes the image detecting component to detect the style capable of emitting the light, and analyzes the coordinates of the stylus to provide the corresponding operation command. Generally, the stylus capable of emitting the light includes a battery to supply electric power. When the battery is deficient in power, the light emitted from the stylus is dim, and detection sensitivity of the optical touch apparatus is decreased. Therefore the stylus capable of emitting the light usually includes a power detecting component to inspect the electrical quantity of the battery. However, manufacturing cost of the conventional active radiating stylus with the power detecting component is expensive, and volume of the conventional active radiating stylus is huge in order to accommodate the power detecting component. The conventional active radiating stylus has drawbacks of expensive cost, enormous volume and inconvenient operation.

SUMMARY OF THE INVENTION

The present invention provides a coordinate positioning module having power detecting function and a related optical touch system, a method of detecting power of an active touch medium and a method of switching modes of the active touch medium for solving above drawbacks.

According to the claimed invention, a method of detecting power of an active touch medium is disclosed. The method includes capturing an image with an optical signal outputted from the active touch medium, reading a first threshold value, comparing an intensity of the optical signal and the first threshold value, and executing a low power mode when the intensity of the optical signal is substantially smaller than the first threshold value.

According to the claimed invention, a method of switching modes of an active touch medium is disclosed. The method includes receiving an operation command, and decreasing an outputting frequency of an optical signal according to the operation command.

According to the claimed invention, a coordinate positioning module having power detecting function is disclosed. The coordinate positioning module includes an image detecting component and a processor. The image detecting component captures an image with an optical signal outputted from an active touch medium. The processor is electrically connected to the image detecting component. The processor compares an intensity of the optical signal and a first threshold value, and executes a low power mod when the intensity of the optical signal is substantially smaller than the first threshold value. The processor further compares the intensity of the optical signal and a second threshold value to determine a rendering region of the optical signal on the image, and calculates coordinates of the active touch medium according to the rendering region of the optical signal.

According to the claimed invention, an optical touch system is illustrated. The optical touch system includes a panel, an active touch medium and a coordinate positioning module. The active touch medium outputs an optical signal. The active touch medium is movably disposed on a surface of the panel. The coordinate positioning module includes an image detecting component and a processor. The image detecting component captures the optical signal projected on the panel and forms an image. The processor is electrically connected to the image detecting component. The processor compares an intensity of the optical signal and a first threshold value, and executes a low power mod when the intensity of the optical signal is substantially smaller than the first threshold value. The processor further compares the intensity of the optical signal and a second threshold value to determine a rendering region of the optical signal on the image, and calculates coordinates of the active touch medium according to the rendering region of the optical signal.

The optical touch system of the present invention can utilize the coordinate positioning module to detect the intensity of the optical signal outputted from the active touch medium. The optical signal can be visible light or invisible light. When the image detecting component captures the image with the optical signal, the processor can compare the intensity of the optical signal to the first threshold value and the second threshold value, so as to determine whether the intensity of the optical signal is sufficient. As the intensity of the optical signal is sufficient, the processor executes the coordinate positioning function of the active touch medium. As the intensity of the optical signal is insufficient, the processor can switch the optical touch system from several low power modes, and one low power mode is selected according to the surroundings, location and personal demand, such as providing the prompt message with the power deficiency information, or other methods of extending the usage time of the active touch medium and economizing the power consumption. Thus, the optical touch system, the method of detecting the power of the active touch medium, and the method of switching the modes of the active touch medium of the present invention do not use additional electronic components. The optical touch system of the present invention can utilize the existing equipment to directly detect the power of the active touch medium, so as to be reference for switching the operational modes of the active touch medium or providing the prompt message of battery exchange of the active touch medium.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
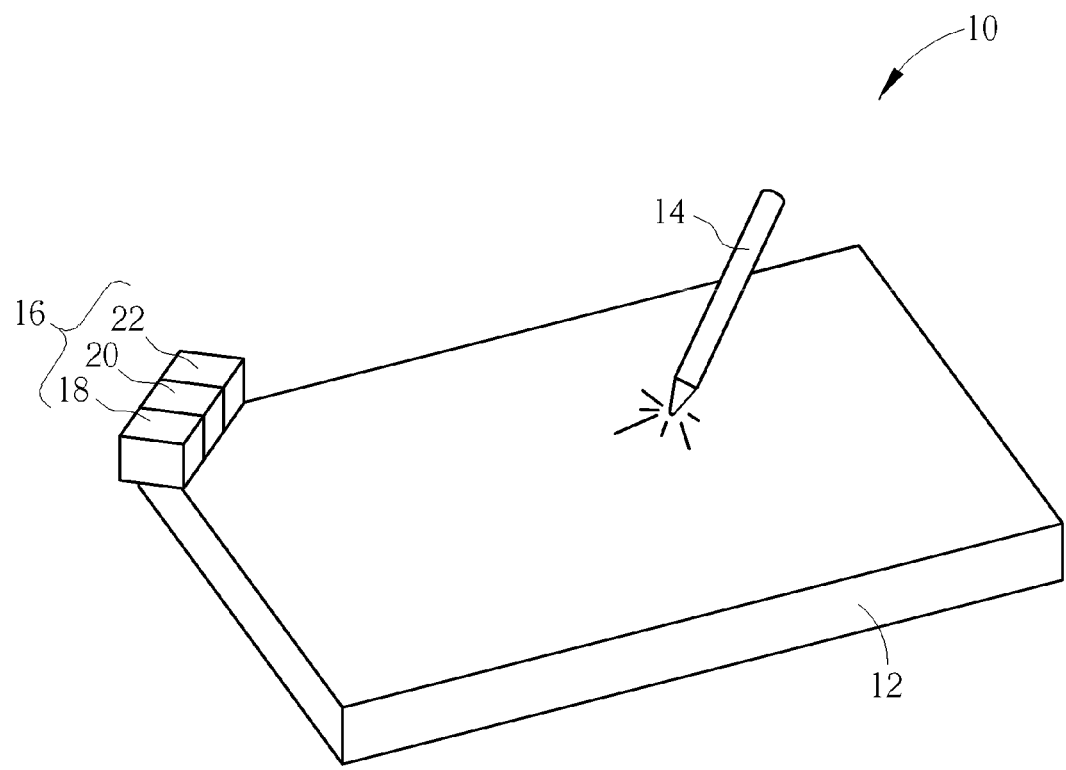
FIG. 1 is a diagram of an optical touch system according to an embodiment of the present invention.

Please refer to FIG. 1. FIG. 1 is a diagram of an optical touch system 10 according to an embodiment of the present invention. The optical touch system 10 includes a panel 12, an active touch medium 14 and a coordinate positioning module 16. In the embodiment, the panel 12 can be a normal whiteboard or a displaying screen. The coordinate position module 16 is disposed on a corner of the panel 12, and the active touch medium 14 can be a stylus capable of emitting light. The active touch medium 14 can move above the surface of the panel 12 to input a command. The coordinate positioning module 16 can detect an optical signal S outputted from the active touch medium 14, and calculate track coordinates of the active touch medium 14 over the panel 12, so as to actuate the application program corresponding to the command according to the coordinates.

As shown in FIG. 1, the coordinate positioning module 16 includes an image detecting component 18 and a processor 20 (in another case, the image detecting component 18 and the processor 20 may be disposed at different location). The image detecting component 18 can capture an image with the optical signal S projected on the panel 12. The processor 20 is electrically connected to the image detecting component 18. The processor 20 compares an intensity of the optical signal S to a first threshold value T1 and a second threshold value T2. When the intensity is substantially greater than the first threshold value T1, the active touch medium 14 is full of power (which means the electric quantity is sufficient), the processor 20 can continuously compare the intensity and the second threshold value T2 to find out coordinates of the active touch medium 14 over the panel 12. The optical signal S is dim when the active touch medium 14 is deficient in power. As the intensity is substantially smaller than the first threshold value T1, power of the active touch medium 14 is lower than a warning level. The processor 20 can execute a low power mode to extend usage time of the active touch medium 14 and to show the reminder.

For example, the coordinate positioning module 16 can further include a screen 22 (or a status indicating light) electrically connected to the processor 20. The screen 22 can be a small size displaying panel, selectively. When the processor 20 executes the low power mode, a prompt message with information of power deficiency can be provided on the screen 22 to be the reminder. The prompt message may suggest exchange of operating modes of the active touch medium 14, switch election of the low power mode, exchange of storage unit (such as a battery) of the active touch medium 14, and power charging of the active touch medium 14. Application of the prompt message is not limited to the above-mentioned embodiments, which depends on design demand, and detailed description is omitted herein for simplicity.

The optical touch system 10 of the present invention can further decrease the first threshold value T1 or the second threshold value T2 when the processor 20 executes the low power mode. The first threshold value T1 is decreased to delay actuating time of the low power mode, so as to prevent the user from being bothered by the prompt message of the low power mode, which is generated when the active touch medium 14 is deficient in power and the optical touch system 10 executes the low power mode automatically. In addition, though determining accuracy of the rendering region of the optical signal S on the image by the processor 20 will be decreased when the second threshold value T2 is decreased, the processor 20 can utilize the new-set lower second threshold value T2 to effectively analyze a peak of the optical signal S when the intensity of the optical signal S is insufficient. Thus, the processor 20 can find out the rendering region of the optical signal S on the image when the optical touch system 10 is in the low power mode, so as to calculate the coordinates of the active touch medium 14 on the panel 12, and to extend the usage time of the active touch medium 14.

Further, the processor 20 can provide an operation command when the optical touch system 10 is in the low power mode. The operation command can control the active touch medium 14 to decrease an outputting frequency of the optical signal S, and to decrease an image capturing frequency of the image detecting component 18 accordingly. The image capturing frequency is decreased to drive the image detecting component 18 to accurately capture the image with the low-frequency optical signal S synchronously. Power consumption of the active touch medium 14 can slow down when the active touch medium 14 outputs the low-frequency optical signal S, so as to extend the usage time of the active touch medium 14.

Figure 2:
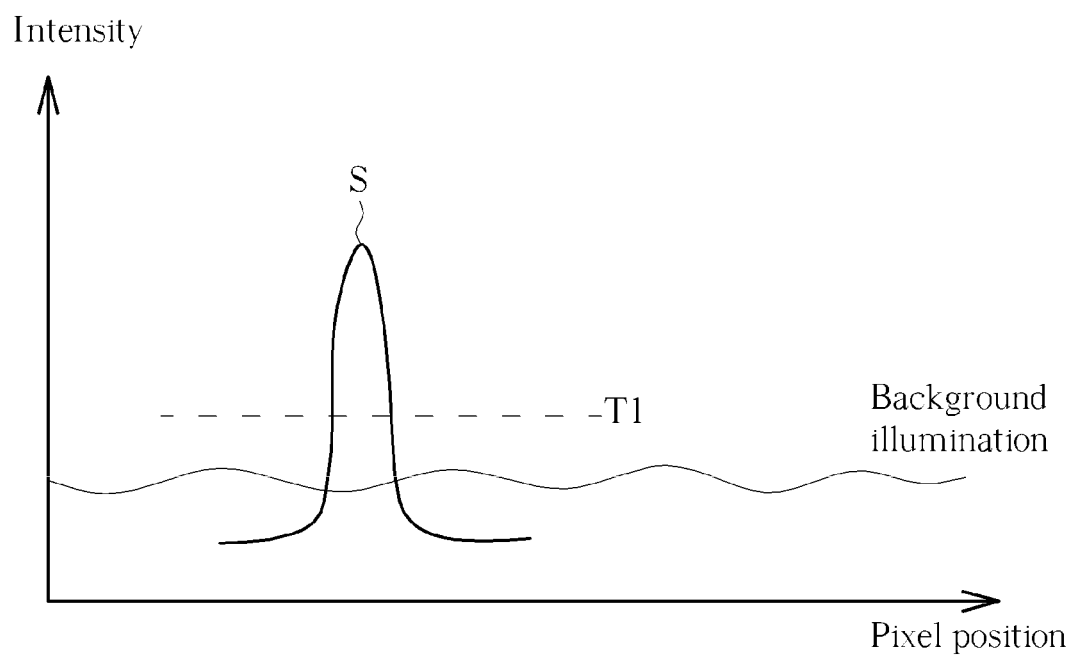
FIG. 2 is an image detection diagram of the optical touch system according to the embodiment of the present invention.

Please refer to FIG. 2. FIG. 2 is an image detection diagram of the optical touch system 10 according to the embodiment of the present invention. The present invention can set the first threshold value T1 according to the maximum intensity of the optical signal S. For example, the first threshold value T1 can be equal to twenty percent, forty percent or sixty percent of the maximum intensity of the optical signal S. The intensity of the optical signal S can include a plurality of intensity magnitudes, and the intensity magnitudes can form a wave shown in FIG. 2. The image captured by the image detecting component 18 can include a plurality of columns, and an amount of the columns corresponds to pixels of the image. Each column includes several pixel values, the maximum pixel value (or an average of two largest pixel values) of the column can be a typical weight of the said column, so that each intensity magnitude of the optical signal S represents the typical weight of the corresponding column in the image whereon the optical signal S is projected. For example, a peak of the optical signal S corresponds to the column having the largest typical weight of in the image.

With the power consumption of the active touch medium 14, the peak of the optical signal S is descended. The processor 20 can repeatedly compare the first threshold value T1 and the intensity of the optical signal S according to a predetermined period. The processor 20 can actuate the low power mode when the intensity of the optical signal S is lower than the first threshold value T1, so that the optical touch system 10 of the present invention can detect the power (electric quantity) of the active touch medium 14, and execute the auxiliary function according to magnitude of the power. As shown in FIG. 2, the first threshold value T1 is decreased to delay the actuating time of the low power mode.

Figure 3:
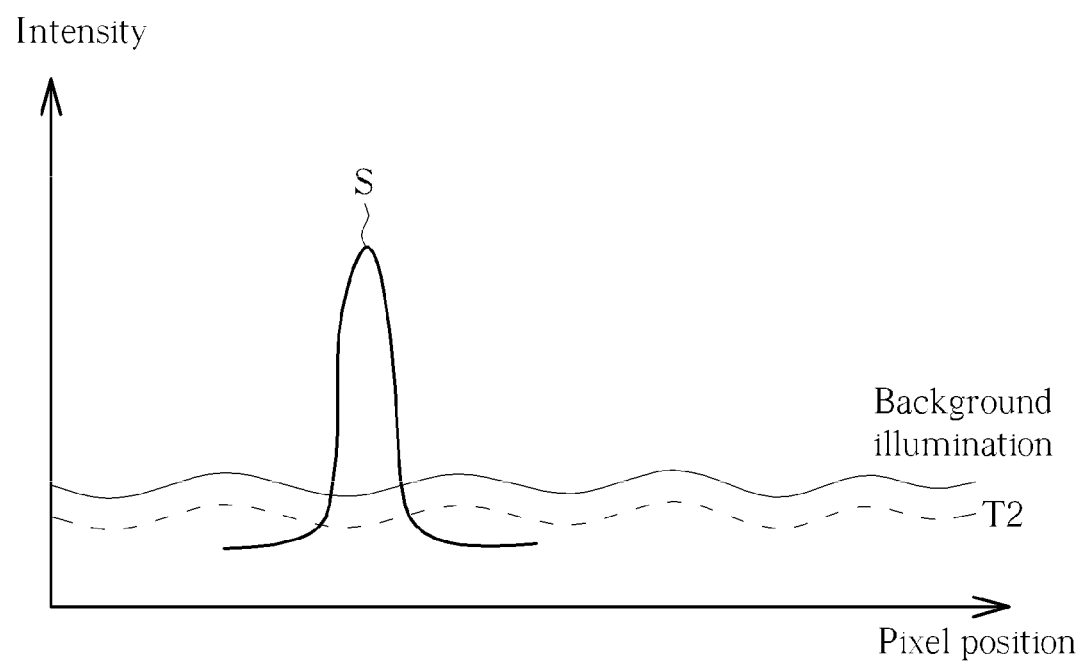
FIG. 3 is the other image detection diagram of the optical touch system according to the embodiment of the present invention.

Please refer to FIG. 3. FIG. 3 is the other image detection diagram of the optical touch system 10 according to the embodiment of the present invention. The present invention can set the second threshold value T2 according to background illumination of the image. For example, the second threshold value T2 can be equal to eighty percent of the background illumination. The second threshold value T2 can include a plurality of threshold magnitudes to respectively correspond to weight thresholds of the columns in the image. Therefore, the processor 20 of the coordinate positioning module 16 can compare the intensity of the optical signal S and the second threshold value T2, determine a rendering region of the optical signal S on the image according to the peak of the optical signal S, and calculate the coordinates of the active touch medium 14 by the rendering region of the optical signal S. As shown in FIG. 3, the coordinate position module 16 can accurately detect the optical signal S outputted from the active touch medium 14, which is in the low power mode, when the second threshold value T2 is decreased, so as to extend the usage time of the active touch medium 14.

Figure 4:
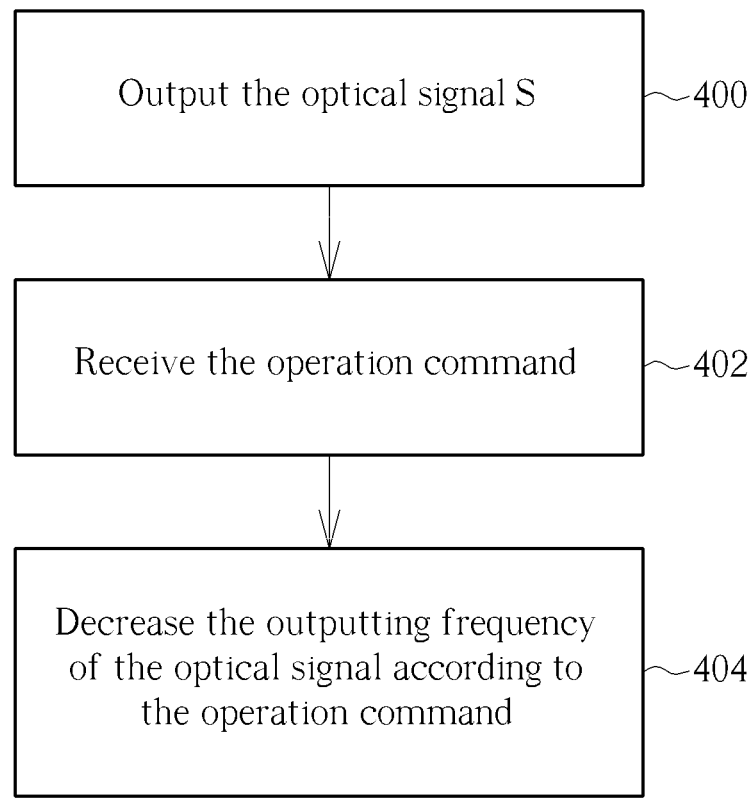
FIG. 4 is a flow chart of switching the modes of an active touch medium according to the embodiment of the present invention.

Please refer to FIG. 4. FIG. 4 is a flow chart of switching the modes of the active touch medium 14 according to the embodiment of the present invention. The method of switching the modes of the active touch medium 14 shown in FIG. 4 is applied to the active touch medium 14 shown in FIG. 1. First, step 400 is executed to output the optical signal S. The outputting frequency of the optical signal S is an initial predetermined frequency of the active touch medium 14. The processor 20 may output the operation command to switch the optical touch system 10 into the low power mode when the active touch medium 14 is deficient in power. Then, step 402 is executed to receive the operation command, and step 404 is executed to decrease the outputting frequency of the optical signal S according to the operation command. The optical touch system 10 of the present invention can control the active touch medium 14 in the low power mode to selectively decrease the outputting frequency, so as to reduce the power consumption of the active touch medium 14 and further to extend the usage time of the active touch medium 14.

Figure 5:
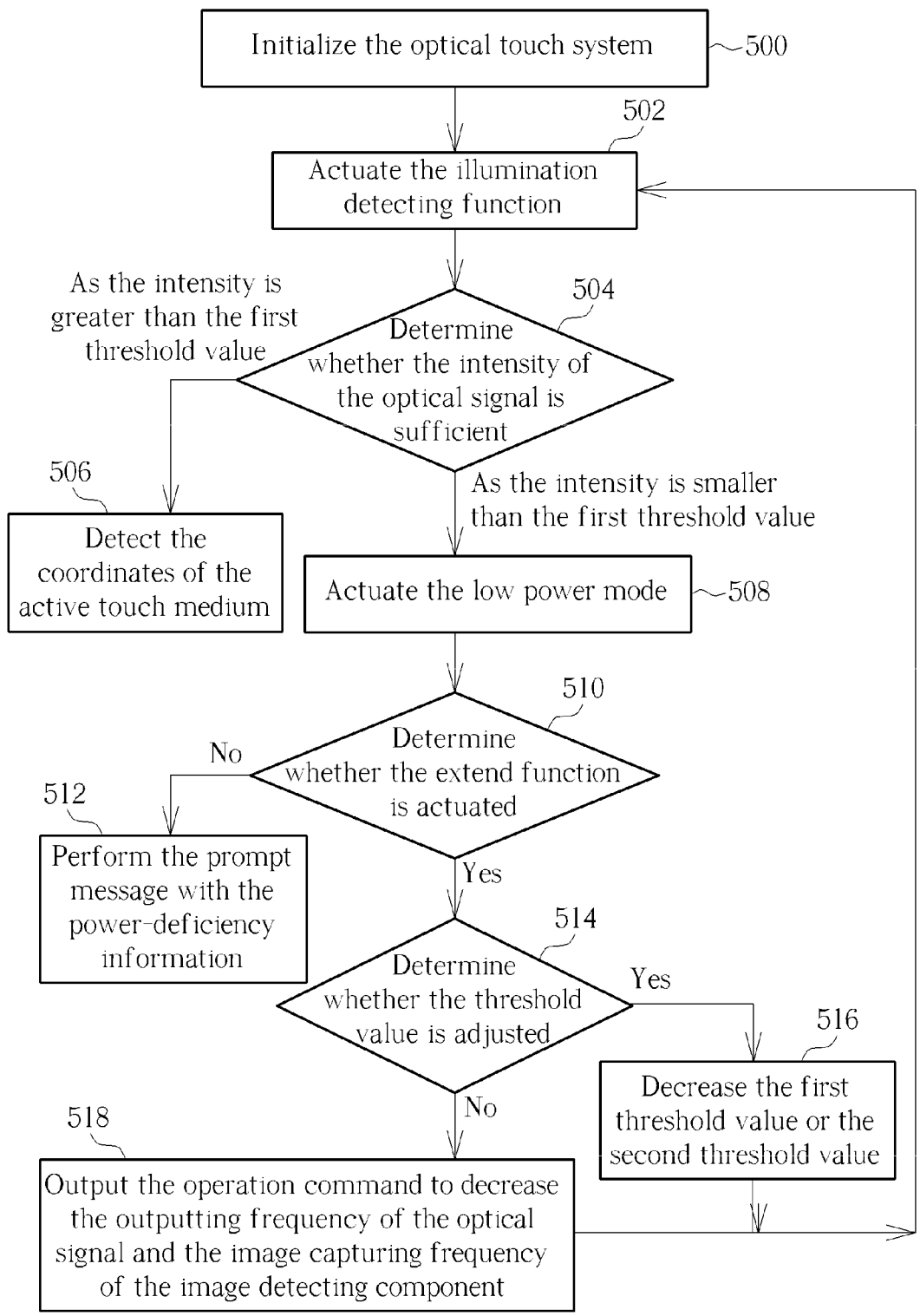
FIG. 5 is a flow chart of detecting the power of the active touch medium according to the embodiment of the present invention.

Please refer to FIG. 5. FIG. 5 is a flow chart of detecting the power of the active touch medium 14 according to the embodiment of the present invention. The method of detecting the power of the active touch medium 14 shown in FIG. 4 is applied to the coordinate positioning module 16 shown in FIG. 1. First, step 500 is executed to initialize the optical touch system 10. Then, step 502 is executed to actuate the illumination detecting function. The processor 20 can drive the image detecting component 18 to capture the image on the panel 12, and the image includes the optical signal S outputted from the active touch medium 14. Then, step 504 is executed to determine whether the intensity of the optical signal S is sufficient. The intensity of the optical signal S can be determined by following procedures. The processor 20 connects a memory module to read the first threshold value T1, and compares the first threshold value T1 to the intensity of the optical signal S.

As the intensity of the optical signal S is substantially greater than the first threshold value T1, step 506 is executed to detect the coordinates of the active touch medium 14. The coordinates of the active touch medium 14 can be detected by following procedures. The processor 20 connects the memory module to read the second threshold value T2, and compares the intensity of the optical signal S to the second threshold value T2. Then, the processor 20 can acquire the rendering region of the optical signal Son the image when one of the intensity magnitudes is greater than a corresponding threshold magnitude of the second threshold value T2, and further utilize the rendering region to calculate the coordinates of the active touch medium 14 on the panel 12.

As the intensity of the optical signal S is substantially smaller than the first threshold value T1, step 508 is executed to actuate the low power mode. The low power mode includes method of extending the usage time of the active touch medium 14 and providing the prompt message with power-deficiency information. For executing selection of the low power mode, step 510 is executed to determine whether the extend function is actuated. Step 512 can be executed to not actuate the extend function of the active touch medium 14, and the prompt message with the power-deficiency information is provided. The low power mode in step 512 can utilize characters, pattern, sound and beams to show the prompt message with the power-deficiency information. Application of the prompt message is not limited to the above-mentioned embodiments, and depends on design demand. Furthermore, step 514 is executed to determine whether the threshold value is adjusted when the extend function of the active touch medium 14 is selected and actuated.

Step 516 can be executed to decrease the first threshold value T1 or the second threshold value T2 as the user intends to adjust the threshold value. The method of decreasing the detecting threshold value of the image detecting component 18 is introduced as above illustration, and detailed description is omitted herein for simplicity. The user can selectively decrease the first threshold value T1 only, or decrease the second threshold value T2 only, or decrease the first threshold value T1 and the second threshold value T2 simultaneously according to predetermined parameters of the coordinate positioning module 16 and actual demand, so as to effectively extend the usage time of the active touch medium 14. As the user does not adjust the threshold value, step 518 is executed to output the operation command to decrease the outputting frequency of the optical signal S outputted from the active touch medium 14 and the image capturing frequency of the image detecting component 18. The power consumption of the active touch medium 14 can be reduced by step 518, so as to economize the power and to extend the usage time.

In conclusion, the optical touch system of the present invention can utilize the coordinate positioning module to detect the intensity of the optical signal outputted from the active touch medium. The optical signal can be visible light or invisible light. When the image detecting component captures the image with the optical signal, the processor can compare the intensity of the optical signal to the first threshold value, so as to determine whether the intensity of the optical signal is sufficient. As the intensity of the optical signal is sufficient, the processor executes the coordinate positioning function of the active touch medium. As the intensity of the optical signal is insufficient, the processor can switch the optical touch system from several low power modes, and one low power mode is selected according to the surroundings, location and personal demand, such as providing the prompt message with the power deficiency information, or other methods of extending the usage time of the active touch medium and economizing the power consumption.

Thus, the optical touch system, the method of detecting the power of the active touch medium, and the method of switching the modes of the active touch medium of the present invention do not use additional electronic components. The optical touch system of the present invention can utilize the existing equipment to directly detect the power of the active touch medium, so as to be reference for switching the operational modes of the active touch medium or providing the prompt message of battery exchange of the active touch medium.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of detecting power of an active touch medium, the method comprising:
   capturing an image with an optical signal outputted from the active touch medium;
   reading a first threshold value;
   comparing an intensity of the optical signal and the first threshold value;
   executing a low power mode to decrease a second threshold value when the intensity of the optical signal is substantially smaller than the first threshold value;
   reading the second threshold value;
   comparing the intensity of the optical signal and the second threshold value;
   determining an imaging region of the optical signal on the image; and
   calculating coordinates of the active touch medium according to the imaging region of the optical signal.

2. The method of claim 1, wherein executing the low power mode comprises:
   providing a prompt message with information of power deficiency.

3. The method of claim 1, wherein executing the low power mode comprises:
   outputting an operation command to control the active touch medium to decrease an outputting frequency of the optical signal.

4. The method of claim 3, wherein outputting the operation command comprises:
   decreasing an image capturing frequency, wherein the image capturing frequency corresponds to the outputting frequency of the optical signal.

5. The method of claim 1, wherein determining the imaging region of the optical signal on the image comprises:
   acquiring the imaging region when an intensity magnitude of the intensity is substantially greater than a corresponding threshold magnitude of the second threshold value.

6. A coordinate positioning module having power detecting function, the coordinate positioning module comprising:
   an image detecting component for capturing an image with an optical signal outputted from an active touch medium; and
   a processor electrically connected to the image detecting component, the processor comparing an intensity of the optical signal and a first threshold value, and executing a low power mode when the intensity of the optical signal is substantially smaller than the first threshold value, the processor further comparing the intensity of the optical signal with a second threshold value, determining an imaging region on the image by a comparing result of the intensity of the optical signal and the second threshold value, and calculating coordinates of the active touch medium according to the imaging region of the optical signal, wherein the intensity of the optical signal comprises a plurality of intensity magnitudes, each intensity magnitude of the optical signal represents a weight of corresponding column in the image.

7. The coordinate positioning module of claim 6, wherein the low power mode decreases the first threshold value or the second threshold value.

8. The coordinate positioning module of claim 6, wherein the coordinate positioning module further comprises:
   a screen electrically connected to the processor, a prompt message with information of power deficiency being provided on the screen when the coordinate positioning module executes the low power mode.

9. The coordinate positioning module of claim 6, wherein the low power mode provides an operation command to control the active touch medium to decrease an outputting frequency of the optical signal.

10. The coordinate positioning module of claim 9, wherein the low power mode further decreases an image capturing frequency of the image detecting component according to the operation command.

11. An optical touch system comprising:
    a panel;
    an active touch medium for outputting an optical signal, the active touch medium being movably disposed on a surface of the panel; and
    a coordinate positioning module comprising:
        an image detecting component for capturing the optical signal projected on the panel to form an image; and
        a processor electrically connected to the image detecting component, the processor comparing an intensity of the optical signal and a first threshold value, and executing a low power mode mod when the intensity of the optical signal is substantially smaller than the first threshold value, the processor further comparing the intensity of the optical signal with a second threshold value, determining an imaging region on the image by a comparing result of the intensity of the optical signal and the second threshold value, and calculating coordinates of the active touch medium on the panel according to the imaging region of the optical signal.

12. The optical touch system of claim 11, wherein the intensity of the optical signal comprises a plurality of intensity magnitudes, each intensity magnitude of the optical signal represents a weight of corresponding column in the image.

13. The optical touch system of claim 11, wherein the second threshold value comprises a plurality of threshold magnitudes, the threshold magnitudes respectively correspond to weight thresholds of columns in the image.

14. The optical touch system of claim 11, wherein the low power mode decreases the first threshold value or the second threshold value.

15. The optical touch system of claim 11, wherein the coordinate positioning module further comprises:
    a screen electrically connected to the processor, a prompt message with information of power deficiency being provided on the screen when the coordinate positioning module executes the low power mode.

16. The optical touch system of claim 11, wherein the low power mode provides an operation command to control the active touch medium to decrease an outputting frequency of the optical signal.

17. The optical touch system of claim 16, wherein the low power mode further decreases an image capturing frequency of the image detecting component according to the operation command.

18. A method of detecting power of an active touch medium, the method comprising:
   capturing an image with an optical signal outputted from the active touch medium;
   reading a first threshold value;
   comparing an intensity of the optical signal and the first threshold value;
   executing a low power mode when the intensity of the optical signal is substantially smaller than the first threshold value; and
   decreasing the first threshold value to delay actuating time of the low power mode.

19. A coordinate positioning module having power detecting function, the coordinate positioning module comprising:
   an image detecting component for capturing an image with an optical signal outputted from an active touch medium; and
   a processor electrically connected to the image detecting component, the processor comparing an intensity of the optical signal and a first threshold value, and executing a low power mode mod when the intensity of the optical signal is substantially smaller than the first threshold value, the processor further comparing the intensity of the optical signal with a second threshold value, determining an imaging region on the image by a comparing result of the intensity of the optical signal and the second threshold value, and calculating coordinates of the active touch medium according to the imaging region of the optical signal, wherein the second threshold value comprises a plurality of threshold magnitudes and the threshold magnitudes respectively correspond to weight thresholds of columns in the image.

* * * * *